United States Patent
Weir et al.

[11] Patent Number: 6,079,942
[45] Date of Patent: Jun. 27, 2000

[54] PUMP SEAL FLUSHING RING

[75] Inventors: James Weir, Battle Creek; Glen D. Holtz, Brighton, both of Mich.

[73] Assignee: Simpson Industries, Inc., Plymouth, Mich.

[21] Appl. No.: 09/290,797

[22] Filed: Apr. 13, 1999

Related U.S. Application Data

[60] Provisional application No. 60/085,950, May 19, 1998.

[51] Int. Cl.[7] ................................................ F04D 29/08
[52] U.S. Cl. ........................... 415/111; 415/111; 415/230; 415/915
[58] Field of Search ..................... 415/111, 230, 415/915; 277/367, 369, 381, 407, 408, 393, 635

[56] References Cited

U.S. PATENT DOCUMENTS

| | | |
|---|---|---|
| 2,323,730 | 7/1943 | Shenton . |
| 3,101,199 | 8/1963 | Hartnagel . |
| 4,275,889 | 6/1981 | Butler et al. ............................ 277/393 |
| 4,289,320 | 9/1981 | Altnau . |
| 4,301,893 | 11/1981 | St. Jean . |
| 4,498,681 | 2/1985 | Heinz . |
| 4,746,270 | 5/1988 | Hale . |
| 5,226,209 | 7/1993 | Baker . |
| 5,332,361 | 7/1994 | Brass et al. ............................ 415/231 |
| 5,558,343 | 9/1996 | Aparicio, Jr. . |
| 5,605,338 | 2/1997 | Poll . |
| 5,755,817 | 5/1998 | Prouty . |

*Primary Examiner*—Edward K. Look
*Assistant Examiner*—Ninh Nguyen

[57] ABSTRACT

A pump seal flushing ring (12) for a vehicle fluid pump (10) includes a top portion (22) and a bottom portion (20) and a tapered wall (36) extending therebetween. The bottom portion (20) has an opening (28) formed therein for communicating with a pump seal (52) to seal off the fluid chamber of the pump from the mechanical portion of the pump. The tapered wall (36) has a plurality of holes (48) formed therein that are uniformly spaced about the periphery of the tapered wall (36) to evenly communicate fluid to all portions of the seal (52).

36 Claims, 4 Drawing Sheets

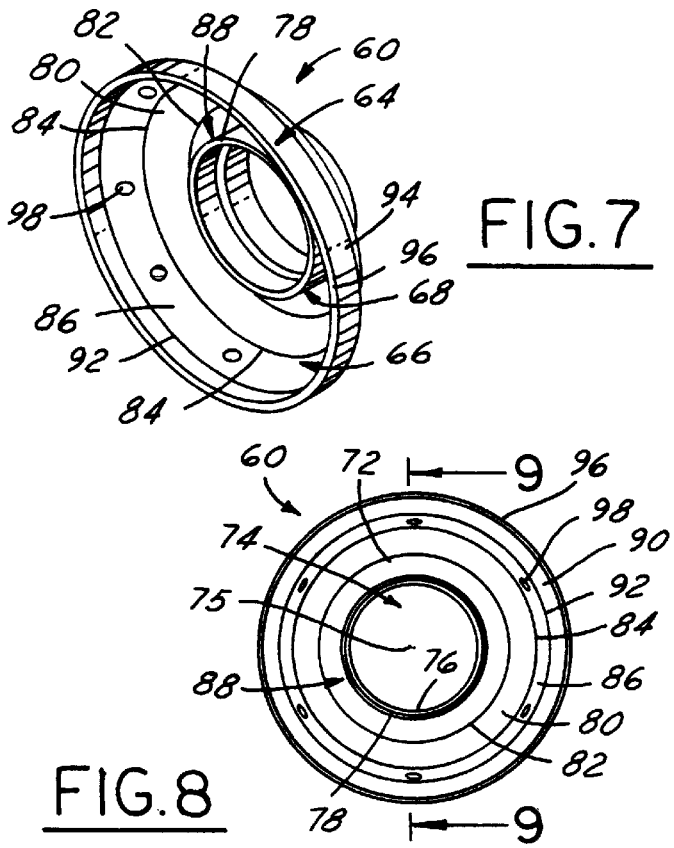
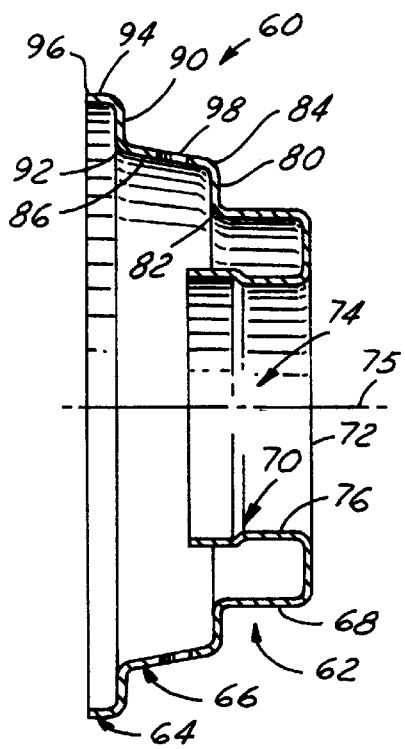
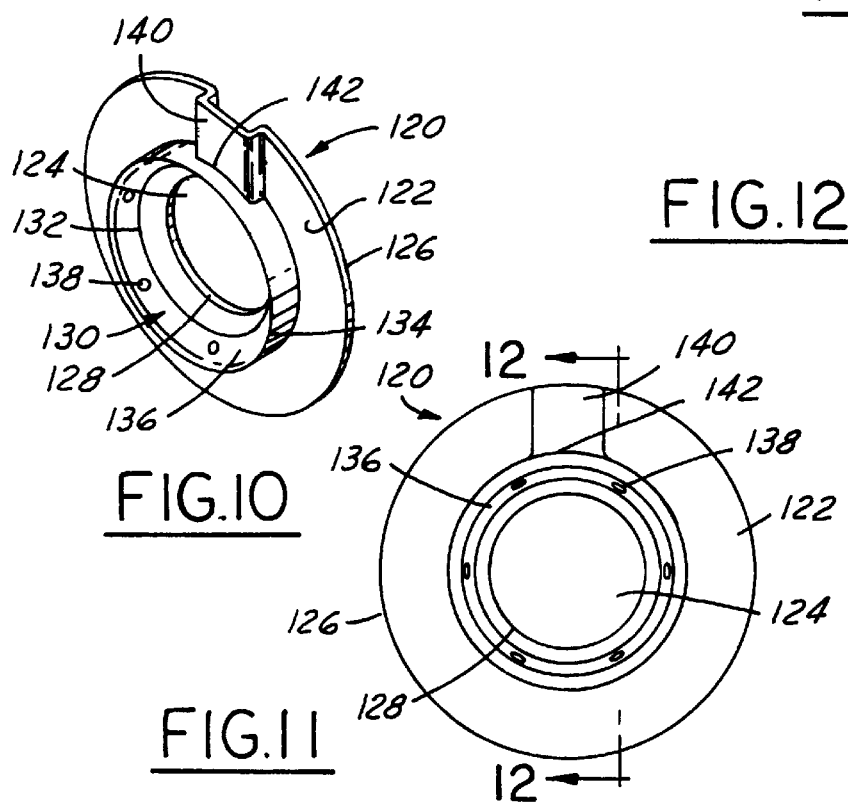
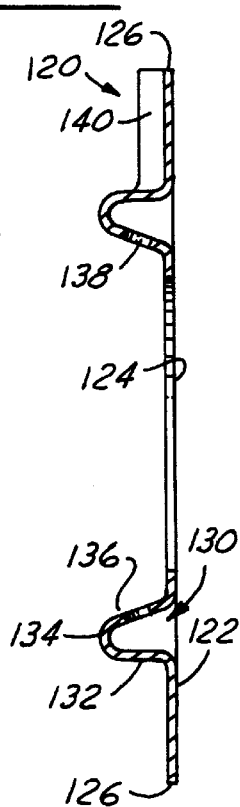

PUMP SEAL FLUSHING RING

CROSS REFERENCE TO RELATED APPLICATIONS

This application claims priority from co-pending U.S. Provisional Application Serial No. 60/085,950, which was filed on May 19, 1998.

TECHNICAL FIELD

The invention relates generally to pump seals. More specifically, the present invention relates to a device that provides more uniform distribution of fluid around a pump seal face to reduce the risk of erosion and fatigue of the pump seal.

BACKGROUND ART

Vehicle coolant pumps, generally referred to as water pumps, incorporate a spring loaded face seal that is subjected to high temperatures, fast rotational speeds, and significant sealing forces. These seals are necessary to prevent leakage of fluid around a moving member, such as a rotating shaft. Common pump seals suffer from a variety of disadvantages, including high incidence of wear, failure due to thermal fatigue, and clogging due to particle accumulation. Failure of the seals obviously results in the undesirable transfer of fluid past the seal.

Current seals can wear in a variety of ways. One common way is due to uneven distribution of fluid surrounding the seal. This uneven distribution can result in the premature wear of the seal dramatically reducing its life. Additionally, if the seal is not sufficiently cooled, or is kept cool unevenly around its circumference, it can fail for this reason as well. While minimal leakage is not severe, and the seals can be replaced before seal wear causes catastrophic failure of the pump, longer lasting and more durable seals are desirable as they will decrease the overall cost of vehicle water pumps as well as allowing the length of their warranties to be increased.

SUMMARY OF THE INVENTION

It is a general object of the present invention to provide an improved sealing mechanism for rotating members. It is another object of the present invention to provide an improved sealing mechanism which is more durable and longer lasting than present sealing mechanisms.

It is also an object of the present invention to provide a device that controls the supply of flushing fluid to a sealing mechanism by redirecting it evenly around the seal through multiple flush port locations, thereby providing more uniform cooling of the seal. It is a further object of the present invention to provide a device that minimizes the potential for "hot spots" on an associated seal.

It is another object of the present invention to provide a device that minimizes the risk of erosion of the seal.

In accordance with these and other objects of the present invention, a pump seal flushing ring for a water pump is provided. The pump seal flushing ring includes a bottom annular surface, having an inner periphery and an outer periphery. The inner periphery defines an opening therein. The bottom annular surface is located distally with respect to a top annular surface. The top annular surface has an inner periphery and an outer periphery. A peripheral retaining wall extends between the outer periphery of the bottom annular surface and the inner periphery of the top annular surface. The peripheral retaining wall has an inner surface which defines a seal receiving cavity therewithin for receiving a portion of a pump seal. The peripheral retaining wall tapers gradually away from the seal receiving cavity as it extends from the bottom annular surface to the top annular surface. The peripheral retaining wall has a plurality of openings formed therein which are uniformly spaced about the periphery of the peripheral retaining wall.

In accordance with a further object of the present invention, a mechanical pump seal device for a water pump is provided. The device includes a top portion and a bottom portion. The bottom portion, includes a seal head portion comprised of an inner peripheral surface and an outer peripheral surface. An annular cavity is formed between the inner peripheral surface and the outer peripheral surface. The bottom portion also has a generally circular passageway formed therein for receipt of a rotatable shaft there through. The general circular passageway is bounded by an inner surface of the inner peripheral surface. A generally sloped retaining wall extends between the top portion and the bottom portion. The retaining wall has a plurality of openings formed therein which are distributed about the periphery of the retaining wall.

Other objects and features of the present invention will become apparent when received in light of the detailed description of the preferred embodiment when taken in conjunction with the attached drawings and appended claims.

BRIEF DESCRIPTION OF THE DRAWINGS

FIG. 7 is a perspective view of a integral pump seal flushing ring and seal head in accordance with another preferred embodiment of the present invention;

FIG. 8 is an end view of the integral pump seal flushing ring and seal head of FIG. 7;

FIG. 9 is a cross-sectional view of the integral pump seal flushing ring and seal head of FIG. 7;

FIG. 10 is a perspective view of a pump seal flushing ring in accordance with another preferred embodiment of the present invention.

FIG. 11 is an end view of a pump seal flushing ring in accordance with another preferred embodiment of the present invention; and FIG. 12 is a cross-sectional view of the pump seal flushing ring of FIG. 10.

BEST MODE(S) OF THE INVENTION

Figure 1:
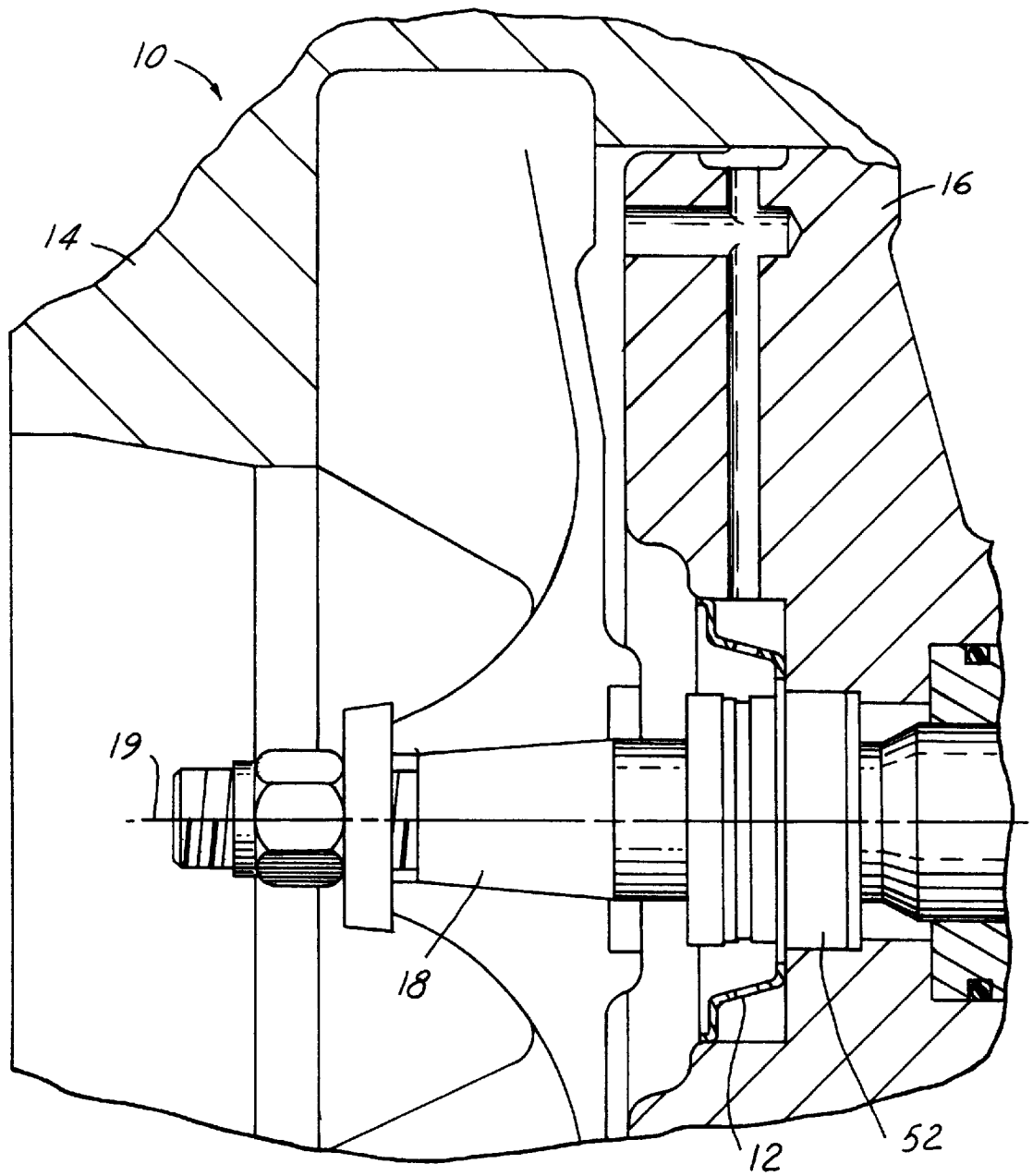
FIG. 1 is a cross-sectional view of a pump housing incorporating a pump seal flushing ring in accordance with a preferred embodiment of the present invention.

FIG. 1 is a cross-sectional view of a portion of a fluid pump 10, such as a vehicle water pump, incorporating a flushing ring 12 in accordance with the present invention. The fluid pump 10 has a flushing ring 12 surrounding a pump sealing member 52 (or "seal") that separates the pump 10 into a first portion 14 and a second portion 16. The first portion 14 receives fluid from a fluid source and delivers it to a delivery site. The second portion 16 contains the mechanism for driving the pump 10 via a shaft 18 that extends through the flushing ring 12. The shaft 18 extends through the flushing ring 12 and is rotatable about an axis 19.

The pump 10 is preferably a water pump for use in a vehicle engine. However, the pump 10 may be used in a variety of automotive and non-automotive applications for pumping a variety of different fluids. Moreover, the present invention may be utilized in any centrifugal pump application. The pump seal flushing ring 12 is preferably located at the junction between the first portion 14 of the pump 10 and the second portion 16 of the pump 10 to lubricate and cool a sealing mechanism that prevents fluid from flowing between the first portion 14 and the second portion 16.

FIGS. 2 through 6 illustrate the pump seal flushing ring 12 in accordance with a preferred embodiment of the present invention. The directional terms "top", and "bottom", "up" and "down" are used herein for directional purposes only and are not intended to be descriptive of actual location or orientation during use. The pump seal flushing ring 12 has a bottom annular surface or bottom portion 20 and a top annular surface or top portion 22. The bottom annular surface 20 is preferably located closer to the second portion 16 of the pump 10 than the top annular surface 22 when the ring 12 is installed in its operating position. The bottom annular surface 20 is preferably generally circular in shape and has an inner periphery 24 and an outer periphery 26. The inner periphery 24 defines a generally circular passageway 28 formed in the bottom annular surface 20.

The top annular surface 22 is preferably generally circular in shape and has an inner periphery 30, an outer periphery 32, and an opening 34 formed therein which is defined by the inner periphery 30. A retaining wall 36 extends between the bottom annular surface 20 and the top annular surface 22. The retaining wall 36 has an inner surface 38 and an outer surface 40. The inner surface 38 of the retaining wall 36 defines a seal receiving chamber 42 for receipt of a pump seal therein.

The retaining wall 36 is preferably integral at a first end 44 with the outer periphery 26 of the bottom annular surface 20 and at a second end 46 with the inner periphery 30 of the top annular surface 22. The retaining wall 36 is preferably tapered and gradually slopes away from the axis 19 as it extends from the bottom annular surface 20 to the top annular surface 22. It should be understood that the retaining wall 36 may extend between various portions of the flushing ring 12 and may be perpendicular, sloped towards the seal receiving chamber 42, curved, or any other conventional configuration.

The retaining wall 36 has a plurality of holes or orifices 48 formed therein. The plurality of holes 48 may be formed in any size and shape and any number of holes may be utilized. The holes 48 are preferably uniformly spaced around the seal receiving chamber 42 to communicate fluid evenly to a pump seal 52 positioned in the chamber 42. The number and size of the openings 48 are preferably provided in order to provide uniform flow of the flushing fluid around the periphery or circumference of the rotating shaft and sealing mechanism. A peripheral flange portion 50 extends generally upward from and perpendicular to the outer periphery 32 of the second annular surface 22.

Figure 2:
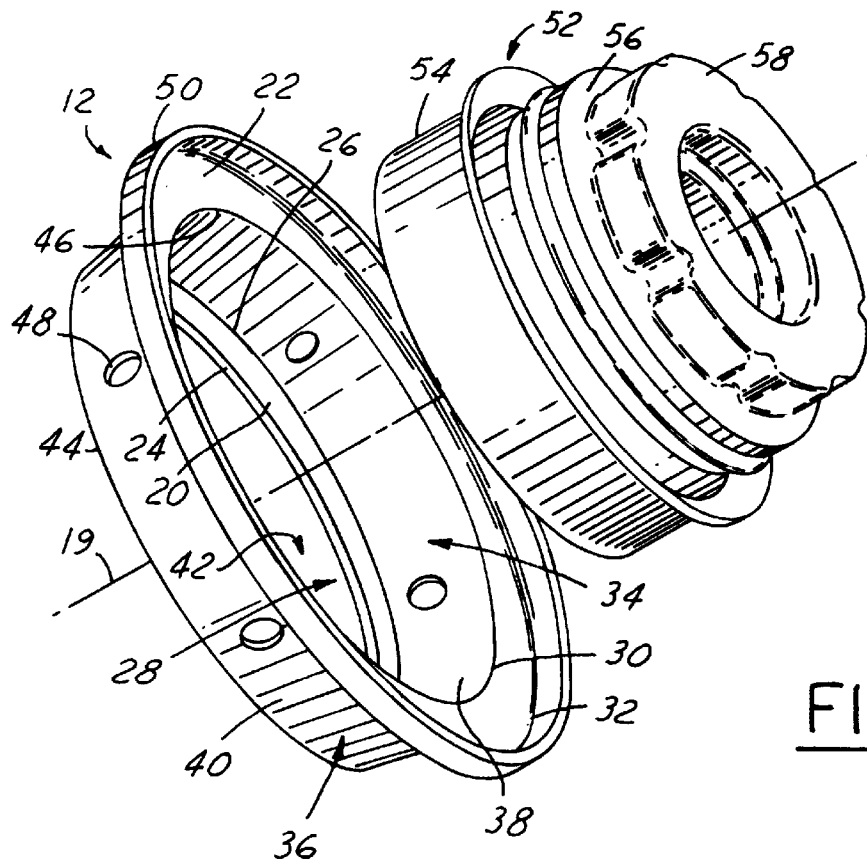
FIG. 2 is an exploded view of a pump seal flushing ring with a pump seal in accordance with a preferred embodiment of the present invention.
Figure 3:
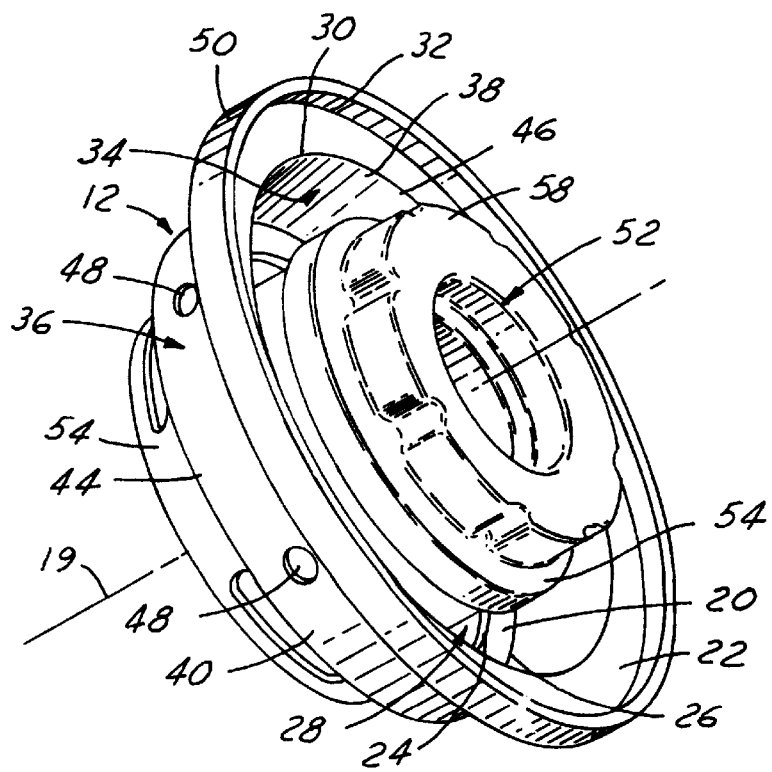
FIG. 3 is a perspective view of a pump seal flushing ring and pump seal assembly in accordance with a preferred embodiment of the present invention.
Figure 4:
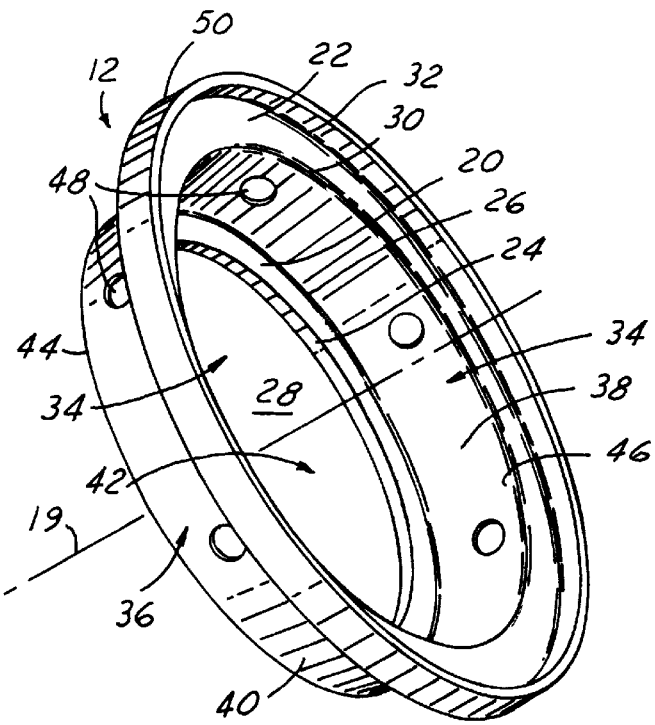
FIG. 4 is a perspective view of a pump seal flushing ring in accordance with a preferred embodiment of the present invention.
Figure 5:
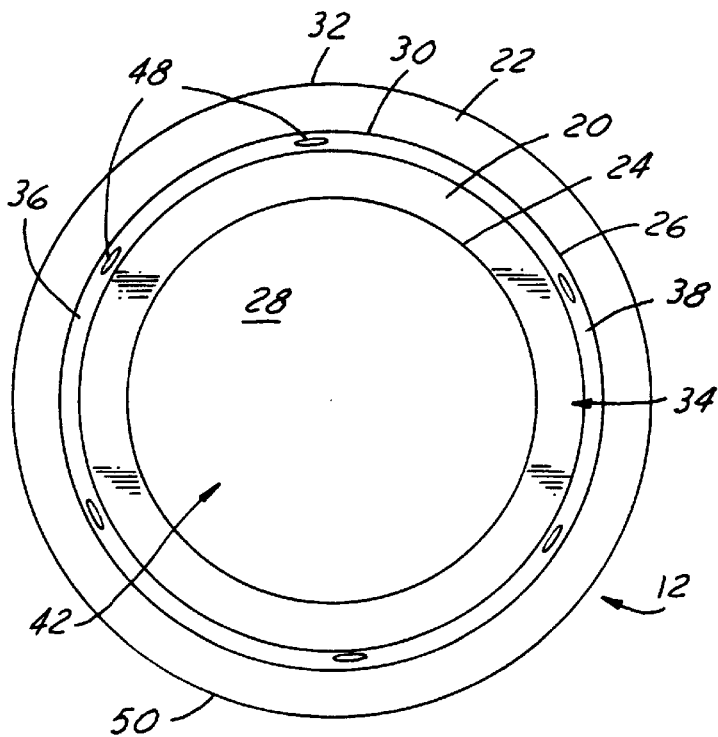
FIG. 5 is an end view of the pump seal flushing ring of FIG. 4.
Figure 6:
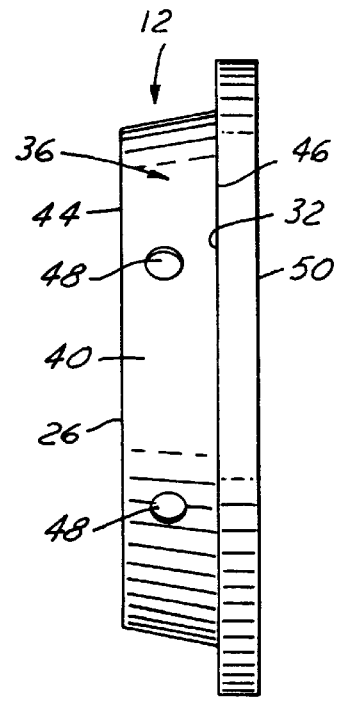
FIG. 6 is a side view of the pump seal flushing ring of FIG. 4.

As shown in FIGS. 2 and 3, the pump seal 52 is disposed within the seal receiving chamber 42. The pump seal 52 has a seal head 54 for contacting the bottom annular surface 20, a middle sealing portion 56, and an upper rotatable bearing portion 58 for engaging the driving shaft 18, as is well known. The pump seal 52 is thus positioned within the seal receiving cavity 42 and through the opening 28 in the bottom annular surface 20 such that no fluid passed to the pump seal 52 will leak from the first portion 14 of the pump 10 to the second portion 16 of the pump 10.

The use of a pump seal flushing ring 12 in accordance with the present invention helps minimize the wear and failure of the pump seal 52. By uniformly distributing high pressure fluid through a plurality of holes 48 uniformly disposed about the retaining wall 42, the high pressure water will act evenly on all portions of the seal 52 such that it will wear uniformly and prolong its life. The holes 48 are preferably disposed such that one of the holes 48 is not in direct alignment with the flow of high pressurized fluid from the fluid source. Further, the configuration of the pump seal flushing ring 12 will remove particles preventing them from damaging the pump seal 52. Additionally, by supplying fluid to all portions of the pump seal 52, it will keep all portions of the pump seal 52 cool, minimizing the risk of failure due to "hot spots". The generally cone shaped configuration of the flushing ring 12 forces liquid to move in a certain direction and thus be evenly distributed around the face of the pump seal 52.

The flushing ring 12 is preferably constructed of a stainless steel material and preferably is formed by known stamping methods. The flushing ring 12, however, may be formed by any known forming method. Further, the flushing ring may be formed of any ferrous material or polymer.

FIGS. 7 through 9 illustrate an alternative preferred embodiment of a pump seal flushing ring 60 in accordance with the preferred embodiment of the present invention. The alternative flush ring 60 includes a bottom portion 62, a top portion 64, and a middle portion 66 disposed between the bottom portion 62 and the top portion 64. The bottom portion 62 includes an outer peripheral wall 68 and an inner peripheral wall 70 which are joined by a bottom surface 72. The outer peripheral wall 68 extends upward from and generally perpendicular to the bottom surface 72 and into engagement with the middle portion 66. The inner peripheral wall 70 defines a shaft passageway 74 therewithin and has an axis 75 located at its centerline. The inner peripheral wall 70 has a first portion 76 that extends generally upward from and perpendicular to the bottom surface 72 and a second portion 78 that is offset away from the axis 75 with respect to the first portion 76 of the inner peripheral wall 70.

The middle portion 66 includes, a middle surface 80 and a retaining wall 86. The middle surface 80 extends generally outwardly from the outer peripheral wall 68 into contact with the retaining wall 86. The middle surface 80 has an inner surface 82 that contacts the outer periphery wall 68 of the bottom portion 62 and an outer surface 84 that is in communication with the retaining wall 86. The retaining wall 86 slopes upward and generally outward away from the axis 75 which passes through the middle point of the shaft passageway 74. The retaining wall 86 terminates in an upper surface 90 which has an inner portion 92 in communication with the retaining wall 86 and an outer portion 94 in communication with an upwardly extending flange 96. The upper surface 90 and the flange 96 form the top portion 64 of the flush ring 60. A plurality of holes 98 are formed through the retaining wall 86 and are preferably uniformly spaced about the retaining wall. Again, as with the prior embodiments, the number and shape of the holes may vary.

The flush ring 60 shown in FIGS. 7 through 9, is for receipt of a pump seal in a seal cavity 88, with a portion of the seal disposed within the passageway 74. The inner peripheral wall 70 is formed as an integral part of the pump seal flush ring 12 and replaces the seal head 54 in the prior embodiment. The bottom portion 62 of the flushing ring 60 communicates directly with the seal to be positioned in the seal cavity 88.

FIGS. 10 through 12 illustrate another alternative pump seal flush ring 120 in accordance with the present invention. The flush ring 120 includes a generally planar surface 122 with a passageway 124 formed therein for receipt of a pump seal. The planar surface 122 has an outer periphery 120 and an inner periphery 128 which defines the passageway 124. An annular cavity 130 is formed in the planar surface 122 about the inner periphery 128 of the passageway 124. The annular cavity 130 includes a downwardly extending wall 132, a curved bottom portion 134 disposed at the bottom of the wall 132 and an inwardly and outwardly sloping retaining wall 136, connecting the curved bottom portion 134 with the planar surface 122. The retaining wall 136 has a plurality of holes 138 formed through for passage of fluid into communication with the seal disposed in the passageway 124.

A fluid passageway 140 is formed integral with the planar surface 122 and is in fluid communication through an opening 142 with the cavity 130 for passing fluid thereto. As shown, the opening 142 of the passageway 140 is not in direct alignment with one of the plurality of holes 138 so that the fluid will travel around the annular cavity and pass through the plurality of holes 138 in a uniform fashion. The passageway 140 is integrally formed as part of the flushing ring 120 to provide a self-contained flushing system. The fluid in the annular cavity 130 is forced through the plurality of holes 138 and into contact with the pump seal through the holes formed in the retaining wall and in contact with the seal.

While particular embodiments of the inventor have been shown and described, numerous variations and alternate embodiments will occur to those skilled in the act. Accordingly, it is intended that the invention be limited only in terms of the appended claims.

In the claims:

1. A pump seal flushing ring, comprising:
   a first annular surface having an inner periphery and an outer periphery, said inner periphery defining an opening;
   a second annular surface having an inner periphery and an outer periphery;
   a retaining wall extending between said outer periphery of said first annular surface and said inner periphery of said second annular surface, and forming a seal receiving chamber therein;
   said retaining wall sloping gradually away from said seal receiving chamber as said retaining wall extends from said first annular surface to said second annular surface; and
   a plurality of openings formed in said retaining wall which are generally uniformly spaced around said retaining wall allowing a fluid to flow through said openings into said seal receiving chamber.

2. The pump seal flushing ring as recited in claim 1, wherein said inner annular surface is dimensioned to contact a pump seal positioned in said seal receiving chamber to prevent leakage of fluid through said opening.

3. The pump seal flushing ring as recited in claim 2, further comprising a flange extending from said outer periphery of said second annular surface.

4. The pump seal flushing ring as recited in claim 2, wherein said flushing ring is formed by stamping.

5. The pump seal flushing ring as recited in claim 2, wherein said flushing ring is made from a ferrous material.

6. The pump seal flushing ring as recited in claim 2, wherein said flushing ring is made from polymer.

7. A flushing ring for a pump seal, comprising:
   a bottom portion having an opening formed therein, said opening being sized to receive an end of the pump seal;
   a top portion located distally from said bottom portion;
   a retaining wall extending between said top portion and said bottom portion, said retaining wall having an inner surface and an outer surface;
   a chamber defined by said inner wall of said retaining wall for housing the pump seal therein, said chamber having a center; and
   a plurality of openings formed in said retaining wall allowing a fluid to flow through each of said openings and into said chamber.

8. The flushing ring as recited in claim 7, wherein said plurality of openings are uniformly spaced about said retaining wall.

9. The flushing ring as recited in claim 8, wherein said bottom portion is generally circular in shape and has an inner periphery and an outer periphery.

10. The flushing ring as recited in claim 9, wherein said top portion is generally circular in shape and has a peripheral portion.

11. The flushing ring as recited in claim 7, wherein said retaining wall is tapered away from said center of said chamber as said retaining wall extends from said bottom portion to said top portion.

12. The flushing ring as recited in claim 10, wherein said retaining wall extends from said outer periphery of said bottom portion to said peripheral portion of said top portion.

13. The flushing ring as recited in claim 11, further comprising a flange portion that extends away from said top portion.

14. The flushing ring as recited in claim 12, wherein said flushing ring is fabricated from stainless steel.

15. The flushing ring as recited in claim 14, wherein said flushing ring is formed by stamping.

16. A water pump for a vehicle engine, comprising:
   a fluid pumping portion for transferring fluid from a fluid reservoir to a fluid delivery source;
   a mechanical portion for operating the fluid pumping portion;
   a pump seal for preventing the egress of fluid from said fluid pumping portion to said mechanical portion;
   a flushing ring in communication with said pump seal to minimize the wear on said seal, said flushing ring including:
      a first portion in communication with said mechanical portion;
      an opening formed in said first portion for communicating with said pump seal to prevent fluid from flowing through said opening;
      a second portion;
      a retaining wall extending between said first portion and said second portion, said retaining wall having an inner surface and an outer surface, said inner surface defining a chamber within which said pump seal is housed; and
      a plurality of openings formed through said retaining wall for communicating fluid from said outer surface into contact with said seal.

17. The water pump as recited in claim 16 wherein said plurality of openings are generally circular in shape.

18. The water pump as recited in claim 16, wherein each of said plurality of openings are located in a single plane.

19. The water pump as recited in claim 16, wherein said plurality of openings are uniformly distributed around said retaining wall.

20. The water pump as recited in claim 16, wherein said retaining wall is tapered as it extends from said first portion to said second portion.

21. The water pump as recited in claim 20, wherein said retaining wall is tapered away from said pump seal.

22. A pump seal assembly, comprising:
   a bottom portion, having a bottom annular surface with an inner periphery and an outer periphery;
   a top portion having a top annular surface with an inner periphery and an outer periphery;
   a retaining wall disposed extending between said bottom portion and said top portion, and forming a seal receiving chamber therein;
   said retaining wall sloping gradually away from said seal receiving chamber as said retaining wall extends from said bottom portion toward said top portion;
   a plurality of openings formed in said retaining wall which are generally uniformly spaced around said retaining wall allowing a fluid to flow through said openings into said seal receiving chamber; and
   a seal portion integrally formed with said bottom portion of the assembly, said integral seal portion having a generally upwardly extending wall having an inner surface which defines a cavity in said bottom portion for passage of a shaft therethrough.

23. The pump seal flushing ring as recited in claim 22, wherein said bottom portion further comprises an outer peripheral wall extending generally upward from said outer periphery surface to define a seal receiving cavity between said upwardly extending wall and said outer peripheral wall.

24. The pump seal flushing ring as recited in claim 22, wherein said plurality of openings are generally circular in shape.

25. The pump seal flushing ring as recited in claim 22, wherein each of said plurality of openings are located in a single plane.

26. The pump seal flushing ring as recited in claim 22, wherein said plurality of openings are uniformly distributed around said retaining wall.

27. The pump seal flushing ring as recited in claim 22, wherein said top portion further comprises a flange portion that extends away from said top annular surface.

28. The pump seal flushing ring as recited in claim 22, wherein said flushing ring is fabricated from stainless steel.

29. The pump seal flushing ring as recited in claim 22, wherein said flushing ring is formed by stamping.

30. A pump seal flushing system, comprising:
   a generally planar surface having an inner periphery and an outer periphery, said inner periphery defining a shaft passageway therethrough;
   an annular cavity formed in said generally planar surface, said annular cavity including an outer wall and an inner wall connected at a junction;
   a plurality of openings formed in said inner wall for communicating a fluid into communication with a seal cavity;
   a fluid passageway formed integral with said planar surface an having in inlet opening and an outlet opening, said outlet opening in communication with said annular cavity to transfer fluid thereto.

31. The pump seal flushing system as recited in claim 30, wherein said inlet opening of said fluid passageway is disposed generally at said outer periphery of said generally planar surface.

32. The pump seal flushing system as recited in claim 31, wherein said plurality of openings are generally circular in shape.

33. The pump seal flushing system as recited in claim 31, wherein each of said plurality of openings are located in a single plane.

34. The pump seal flushing system as recited in claim 31, wherein said plurality of openings are uniformly distributed around said retaining wall.

35. The pump seal flushing system as recited in claim 31, wherein a curved surface is positioned at said junction to connect said inner wall with said outer wall.

36. The pump seal flushing system as recited in claim 35, wherein said inner surface is generally tapered.

* * * * *